Figure 1:
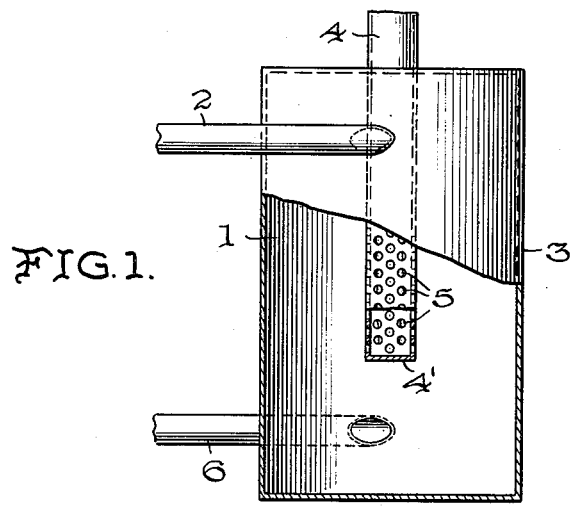

Oct. 1, 1963   A. A. ANDERSON   3,105,778
HEATING AND MIXING METHODS
Filed June 12, 1959

INVENTOR.
ARVID A. ANDERSON
BY James E. Rooney
ATTORNEY

United States Patent Office 3,105,778
Patented Oct. 1, 1963

3,105,778
HEATING AND MIXING METHODS
Arvid A. Anderson, East Baton Rouge, La., assignor to Kaiser Aluminum & Chemical Corporation, Oakland, Calif., a corporation of Delaware
Filed June 12, 1959, Ser. No. 820,062
23 Claims. (Cl. 127—69)

This invention relates to a novel method for mixing and/or heating materials. More particularly, the invention relates to a novel method of solubilizing, dispersing, or emulsifying materials in liquids and/or heating the materials and liquids. The invention is particularly directed to a novel method of heating and/or mixing starch-bearing slurries and carrier liquids to promote the solubilization of the starch therein for subsequent incorporation with chemical and metallurgical pulps containing suspended solids or colloidal material which is to be separated therefrom preferably by decantation operations.

The present invention generally provides for a method of rapidly heating and mixing various materials with a liquid. Thus, the invention has application in methods of solubilizing chemical compounds in liquids; dispersing insoluble chemical compounds in carrier liquids; and emulsifying immiscible liquids. The invention also provides for a method of simultaneously heating during the solubilizing, dispersing, or emulsifying operation.

With respect to the solubilization of chemical compounds in liquids, the method of this invention involves rapid dissolution of a gas, liquid, or solid in a liquid, e.g., dissolving ammonia or chlorine in water; mixing water and ethyl or methyl alcohol; and dissolving metal salts such as sodium chloride, silver nitrate in water, etc.

In the application of the method of this invention to the dispersion of materials in liquids, there may be mentioned, for example, dispersions of gelatin, glue, and other proteins in water; the dispersion of pigments, fillers, etc., in paint vehicles; extraction processes such as the extraction of nickel ores; addition of synthetic polymeric settling aids to pulps; preparation of sols and colloidal dispersions; etc.

Emulsions may be prepared according to the method of this invention by dispersing one liquid in another which is immiscible therewith in conjunction with emulsfying agents and emulsifiers. Thus, for example, various oils and water may be emulsified, such as asphalt in water, and fats and oils into aqueous reaction media designed to split glycerides into fatty acids and glycerol.

Simultaneously with the mixing steps, the method of this invention provides for a heating step. In many cases of mixing materials with a liquid, the mixing is enhanced by using increased temperatures. Thus in the mixing of phenol with water, increased solubility or even complete miscibility can be obtained by increasing the temperature. The heating step of this invention is also applicable to materials and liquids already mixed and it is desired to heat the mixture thereof.

Although the herein described invention has application in a wide variety of mixing operations, it is directed principally and exemplary to a method for heating and/or mixing slurries containing starch-bearing material with carrier liquids as an incident to an overall process involved for treating the starch so as to obtain the most effective results therefrom as a flocculent. Thus, in a particular aspect, the invention is directed to the solubilization of starch in a liquid as an incident treatment for obtaining the proper amount of degradation or depolymerization for pulp settling purposes. Although of extreme importance in processes utilizing the starch content of starch-bearing materials for flocculating purposes, the scope of the invention is not, however, to be limited thereto; but it is furthermore directed to processes wherein the requirements thereof call for the production of viscous solutions of starch in liquids. Such viscous solutions of starch are involved in many industrial applications, among which may be cited, for example, sizes for textiles, adhesives and binding agents, printing ink ingredients, and conditioners for drilling fluids or muds used for example in oil well drilling operations. Also within the purview of the invention is the method of solubilization of starch such as is necessary for the utilization thereof in chemical transformations, as in the manufacture of dextrins, sugars, and syrups wherein it is usually necessary that the starch be solubilized prior to subsequent treatment.

The term "solubilization" as used herein with respect to starch refers to effecting colloidal dispersion of the starch in a liquid to form a smooth, homogeneous sol or colloidal solution. In practical commercial applications the production of a smooth starch sol is extremely difficult because of the lumps and gel formations which appear unless extremely close control of the solubilization process is effected. The herein described invention is directed primarily to overcoming the gel formations which appear prior to effective solubilization of the starch.

As is well known, starch occurs in nature in the form of sacs, granules, or cells, which upon heating with water and/or treatment with certain gelling agents in aqueous solutions swell and finally rupture. The rupture of the cells releases the high molecular weight starch particles into the aqueous surroundings to form a gel and/or a highly viscous colloidal solution depending on the particular conditions involved and the concentration of starch therein. The temperature at which such a formation occurs on heating with pure water depends upon the particular starch-bearing material being used and is of importance in starch technology being known as the "gelation temperature." As examples of gelling agents, caustic solutions such as sodium, potassium or other alkali metal hydroxides, as well as sodium iodide, sodium bromide and sodium thiocyanate may be cited. The gelling agents may obviously be employed in various ways and combinations for effecting the desired rupture of the cells or sacs of naturally occurring starch.

The rapidity with which the cells rupture necessitates using a dilute cold water slurry of the starch-bearing material as a preliminary means for initially dispersing the material in an aqueous surrounding in conventional methods of pasting and solubilizing starch, wherein the cold water slurry is usually added to larger volumes of a liquid wherein the gelation conditions are promoted. Employing the cold water slurry is dictated, as is apparent to those skilled in the art, by the fact that under conditions promoting gelation the starch sacs swell very suddenly and the volume occupied by the sac or granule increases enormously. If a localized condition exists under gelation conditions wherein the concentration of starch is excessively high, a lump of still gel is found to form which resists further dispersion in the liquid and which consequently prohibits efficient and effective employment of the solution which in further processing steps contemplates a smooth solubilized starch solution. Because of the fact that the viscosities of starch solutions during solubilization operations increase very rapidly with employment of increased starch concentrations to the point where a gel is found, it is not usually practical to attempt to solubilize a suspension containing more than about 50 grams per liter of raw starch, such as commercially available corn or potato starches. Under high starch concentrations, the viscosity of the solution during the solubilization will usually become too stiff to facilitate easy handling thereof and the solubilization is frustrated by the gelatinous formations. On the other hand, a suspension or slurry of the raw starch materials in cold water may readily be prepared at concentrations as high as 350 grams per liter as is often done in the preliminary dispersion of the starch-bearing material. If such a concentrated cold water starch slurry were subjected to gelation conditions as by heating or mixing with small quantities of caustic soda, the result, however, would be a stiff rubbery mass unfit for utilization in those processes requiring a solubilized starch. This gel state accordingly is a difficult barrier to overcome in starch solubilization processes.

Therefore, a particular provision of this invention is a method whereby a concentrated suspension of starch-bearing material in cold water may be dispersed in aqueous solution to provide a smooth, lump free starch solution at temperatures above the gelation temperature in said aqueous media or otherwise under gelation conditions. The aqueous solution may or may not contain chemical gelation agents, such as caustic soda or potash.

After the starch has been adequately dispersed or solubilized according to the herein described invention in the aqueous solutions which may be called a carrier liquid for cases wherein the solubilized starch is to be subsequently incorporated in a larger volume of liquid, to form a smooth, viscous solution, it may be still further treated according to the most specific application of the invention to employment of the solubilized starch for flocculating purposes as, for instance, by heating the solubilized starch to promote obtainment of its peak flocculating power. Thus, in preparing a starch solution for use as a flocculating agent to settle the red muds resulting from the digestion of bauxite according to the Bayer process, it is found desirable to hold or digest the starch for various lengths of time in the solution used as the carrier liquid. The length of time for treatment, of course, depends upon the starch-bearing material employed, the temperature, and the concentration of caustic solution operating as the carrier liquid in this case.

Degradation of solubilized starch molecules or depolymerization thereof is evidenced by the decrease in viscosity of a starch solution upon continued contact with gelling agents under gelling conditions. If the degradation is allowed to proceed too far, it is found that the molecular aggregates become so small that they lose to a large extent their power to flocculate and settle the solids in the metallurgical pulps under the most specific application of the herein described invention. In general, it is found that, upon cooking starch-bearing materials in either water or solutions containing caustic soda, the flocculating or settling power of the starch is observed to pass through a broad maximum. Thus for subsequently treating the solubilized starch obtained according to the herein described invention, it is found that for a particular starch, there is an optimum cooking time which will provide the maximum settling or flocculating potential thereof. This maximum settling power is found to depend among other things upon the temperature and the concentration of caustic soda being used in the aqueous media. In general, obtainment of the particular desired flocculating power is a function of time, temperature and the concentration of the caustic soda in Bayer type operation. Thus, under a given set of temperature and caustic soda conditions, the time for obtainment of the peak flocculating power is fixed for any particular starch-bearing material. The time for obtainment of the maximum flocculating power, however, is a function of temperature and by increasing the temperature a shorter period of time is required to obtain the desired result. Consequently, since each particular starch likewise requires a different set of operating conditions for the obtainment of the desired result flexibility in operating conditions of the solubilizing process as well as during degradation are necessarily required in practical operation.

To obtain the most efficient utilization of process equipment and the flexibility necessary in large scale commercial operations requiring variable amounts of solubilized starch, and to furthermore treat a wide variety of starch-bearing materials, it is desirable, especially in Bayer plant type operations, to hold or digest the highly viscous solubilized starch solution in a pressure autoclave at temperatures which vary according to the capacity thereof, the starch-bearing materials employed and the quantity requirements of the Bayer process per se. For example, if one part of a cold-water starch slurry containing 120 grams per liter of a potato starch is mixed with three volumes of Bayer liquor and immediately solubilized therein (a solution approximately 3 normal with respect to free sodium hydroxide and sodium aluminate), it is necessary to provide a temperature in the pressure autoclave of 230° F. for 10 minutes to obtain the maximum settling or flocculating power. Corn starch is found to be more refractory, and a digestion temperature of from about 240° to 270° F. is usually required to develop the maximum settling or flocculating power with the aforesaid residence time in the pressure autoclave. Operations have been carried out on some starches at temperatures as high as 320° F. with no adverse effects on the flocculating power of the starch solutions obtained, provided that the residence time in the digester is shortened accordingly. The aforesaid conditions of time, temperature, and concentration are not necessarily optimum for the aforesaid starch-bearing materials. It is found that there is wide variation in the digestion or temperature requirements in an individual species of starch-bearing materials. The optimum time, temperature and concentration relationship must accordingly be determined experimentally for the starch-bearing material being considered for use. Thus, it is apparent that the temperature conditions are most easily fluctuated to accomplish the desired result since capacity of equipment is fixed and commercial operations and raw starches available do not usually permit constant operating conditions at all times.

From the foregoing it is apparent that a proper continuous method of mixing cold water starch slurries in the carrier liquid is necessary as well as a continuous means for accomplishing variable temperature differences thereof. These requirements are especially difficult to satisfy in view of the gelling tendencies of the starch caused both by the temperature conditions required as well as the fact that the carrier liquid may be, as in the case of Bayer caustic liquors, a gelling agent. Furthermore, the heating of viscous starch solutions as other highly viscous solution is in itself difficult to accomplish by conventional methods.

Although the herein described invention provides a method broadly applicable to heating and/or mixing many types of materials, it provides in a specific embodiment a method for thoroughly dispersing slurries of starch-bearing materials in liquids which have the property, upon contact therewith of rupturing, swelling, gelling, or pasting the cells, granules, or sacs of starch-bearing material. The method, in particular, provides for mixing such starch-bearing slurries with caustic solutions so as to thoroughly disperse and solubilize the starch therein and prevent formation of lumps and to further provide a smooth, practically homogeneous viscous solution.

This invention also provides in its specific embodiment a method of heating aqueous starch slurries or solutions so as to effect uniform heating thereof. Still further, provision is made for heating starch slurries dispersed in aqueous solutions by the direct injection of steam. Particularly, the method of heating starch slurries, which have been dispersed in caustic solutions, is performed in such a manner that local overheating is avoided and in such a manner that steam hammer is avoided and smooth operation is obtained.

Another aspect of this invention in its specific embodiment is the provision of a method for simultaneously heating and mixing starch slurries in liquids as an incident to the solubilization or digestion of the starch in said liquids whereby effective dispersion of the starch therein is accomplished as well as uniform heating thereof. Furthermore, the method provides for simultaneously dispersing starch slurries in a liquid and heating the resulting mixture to the temperature necessary for promoting the solubilization of the said starch for subsequent use as a flocculating or settling agent. Still further the method provides for the simultaneous mixing and heating of starch-bearing slurries and caustic solutions in a most effective manner so as to facilitate obtainment of the maximum flocculating or settling power from the starch when subsequently employed for settlement of the suspended matter in metallurgical and chemical pulps.

As previously stated, one phase of the herein described invention is directed to a novel method of mixing slurries of starch-bearing materials and liquids under conditions promoting the solubilization of the starch therein so as to obtain a smooth solubilized product thereof free from gelatinous lumps of starch. This phase of the invention will be described with regard to employing a caustic solution which rapidly effects the solubilization since it is a gelling agent but it will be apparent to those skilled in the art that other agents or conditions may likewise be present which cause the solubilization and relatively rapid undesirable gel formation. It has been found that by maintaining a relatively elongated zone of rapidly rotating caustic solution, such as is obtained by simultaneously feeding the caustic solution tangentially under pressure to a confined cylindrical vessel and discharging the solution therefrom, and inserting the aqueous starch-bearing slurry into this zone of rapidly rotating caustic solution through a plurality of orifices, whereby the starch-bearing material is inserted under pressure in a plurality of liquid streams; that the aforementioned difficulties as regards the gel formations are overcome and that a smooth viscous solution free from lumps of gel is readily obtained.

Apparently, the particular point of the rapidly rotating zone into which the starch-bearing material is inserted, that is, in the regions of the periphery of the vessel or within the zone itself, is less critical than the fact that a rapidly rotating caustic solution be maintained and that the aqueous starch slurry be injected therein as a plurality of streams. Nevertheless, it has been found most advantageous to insert the slurry of starch-bearing materials through a plurality of orifices located substantially within the zone of rapidly rotating solution and preferably close to the axis of rotation thereof. In this way, the dispersion of the starch is aided by the centrifugal forces, since the density of the starch granules are substantially higher than that of the liquid. This difference in density apparently aids material in dispersing the granules outwardly into the zone and aids in preventing the initial formation of gels by excessively high local concentrations of starch granules.

Figure 2:
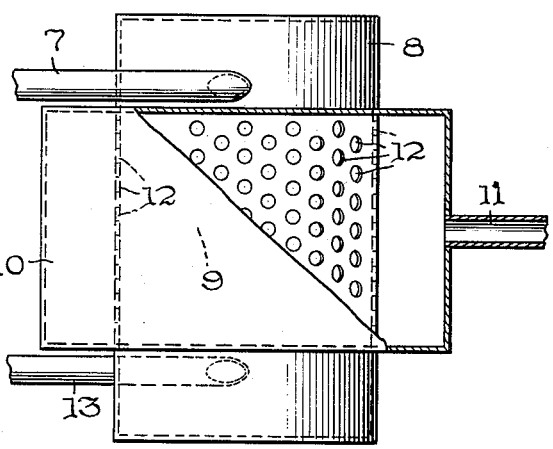
Figure 3:
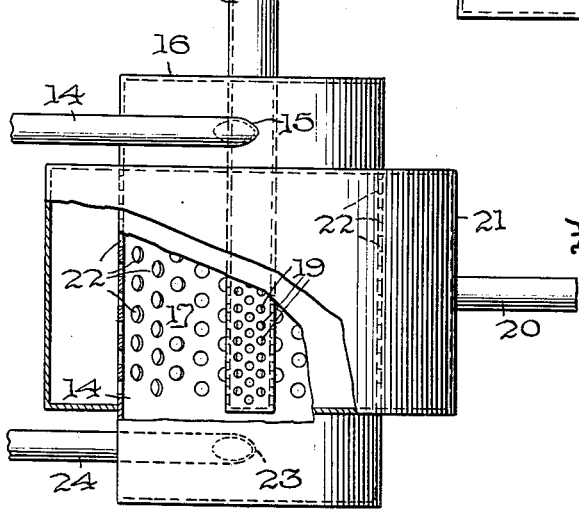

The methods of this invention may be performed in any suitable apparatus. The apparatus schematically represented in FIGURES 1–3 are preferred means for operating the methods of this invention and are suitable for any of the heating and/or mixing steps heretofore referred to. Although the method is described with respect to the specific embodiment thereof relating to starch solubilization, it should be understood that any of the aforementioned solubilizing, dispersing, and emulsifying operations may be performed in a similar manner.

The specific embodiment of the invention as directed to the mixing of caustic solutions and starch-bearing material is schematically represented in FIGURE 1 wherein a zone 1 of rapidly rotating caustic solution is maintained by feeding caustic solution through tangentially located pipe 2 into closed cylindrical vessel 3. The aqueous cold water starch slurry enters the closed cylindrical vessel 3 by feeding same through pipe 4 located axially with respect to the closed cylindrical vessel 3, and which is closed at the terminal point 4' so that the starch-bearing slurry enters zone 1 through a plurality of orifices shown as a plurality of holes 5 located in pipe 4. The mixture of caustic solution and starch-bearing material may then be removed, preferably through a tangentially arranged discharge pipe 6. The resultant mixture is found to be in the desired form of a smooth, gelatinous sol or solution and is unaccompanied by the undesirable gel formations which are carried by improper dispersion among other things.

Another means which may be employed for mixing the slurry of starch-bearing materials with caustic solutions is shown in FIGURE 2, wherein an apparatus in which the mixing operation may be carried out is schematically represented. In this case, a caustic solution is inserted tangentially through pipe 7 under pressure into a closed cylindrical vessel 8 wherein a rapidly rotating zone 9 is maintained through the cyclone type action set up therein. In this case, the cylindrical vessel 8 employed in the embodiment has attached thereto a plenum chamber 10, and is perforated with a plurality of holes 12 about the periphery thereof in proximity with the regions confined by the plenum chamber 10. A starch-bearing slurry is fed to the plenum chamber 10 through pipe 11, from whence the said slurry is injected into the rapidly rotating zone 9 through a plurality of holes 12 defining orifices located in the wall separating the zone 9 from the plenum chamber 10. The mixed products are then discharged from zone 9 through pipe 13 located preferably tangential to the cylindrical vessel 8. In this case, it appears that the greater turbulence which exists at the periphery of the rapidly rotating column of liquid together with the use of a plurality of orifices through which the starch-bearing material is injected in a plurality of liquid streams provides a very rapid and efficient mixing of the starch slurry and caustic liquor, for the result will likewise be found to be in the desired form of a smooth, lump-free viscous solution or sol.

It is apparent to those skilled in the art that a sufficient number of orifices must be employed to insert the required amount of starch-bearing slurry. It is essential to the realization of the benefits of the invention, however, that a plurality thereof be employed so as to effectively disperse the cold water starch slurry in the rapidly rotating liquids. The number of holes to be used depends upon the pressure drop across the orifices, which, in turn depends upon the flow rate of the starch-bearing slurry. In general, it is found that the unit will operate satisfactorily at pressure drops as low as 5 pounds per square inch, a wide range of injection velocities giving satisfactory results.

In general, the smaller the orifice the more easily dispersed is the starch with the consequent elimination of gel formations. In this regard, it has been found that orifice diameters of about ¼ inch or smaller have been found adequate with one to 40 pounds per square inch pressure drop in injecting slurries of starch bearing materials into caustic solutions having a concentration of caustic soda of about 120 grams per liter (equivalent to 3 normal NaOH) at 230° F. to provide a starch solution of about 30 grams per liter.

Likewise, successful mixing operations over a wide range in peripheral velocities of the liquid have been accomplished. Such velocities are a function of the inlet velocity of the caustic liquid. Velocities as low as 5 feet per second have produced successful dispersion of commercially available starches.

It is apparent that the mixing process such as carried out in the units represented in FIGURES 1 and 2 will operate over a wide range of both cold water starch and caustic liquor flow rates. For operations, for example of the Bayer plant type, wherein flexibility is required the units are to be designed for the greatest changes in operating conditions as is apparent to those skilled in the art.

It is also apparent from the herein presented disclosure that combinations of the method of starch insertion such as is shown in FIGURES 1 and 2 may be employed. For example, the invention likewise contemplates insertion of the aqueous starch-bearing slurry simultaneously through the plurality of orifices located in the pipe concentrically arranged within the vessel as well as through a plurality of orifices located at the periphery of the vessel defining the zone wherein the centrifugal action takes place. An example of such an apparatus is shown in FIGURE 3, which will be considered subsequently with respect to combining the heating and mixing operations. The mixing operation as carried out therein is deemed obvious from the foregoing disclosure as to the mixing carried out in units shown in FIGURE 1 and FIGURE 2.

It is likewise apparent, in view of the methods of mixing the starch-bearing aqueous slurries with a caustic solution heretofore given, that the invention is not to be limited to the particular method of inserting the starch-bearing slurries, but rather, that orifices of the nozzle type, may, with equal facility, be employed whereby the starch-bearing slurry is carried thereby into and injected within the rapidly rotating zone between the periphery thereof and the axis of rotation.

According to another phase of the herein described invention it has been found that the highly viscous starch solution can be heated by the direct injection of steam over a wide range of operation by likewise maintaining the solution in a zone rapidly rotating around an axis with simultaneous injection of the steam therein through a plurality of orifices. Thus, by maintaining a rapidly rotating body of solution in a confined heating zone such as by feeding the liquid tangentially to a cylindrical vessel and simultaneously injecting steam into the liquid as a plurality of gaseous streams, it has been discovered that quick and effective heating of the highly viscous starch solutions can be accomplished and elimination of the dangerous steam hammers associated therewith over a wide range of conditions as regards the change in temperature of the liquid undergoing heating.

In general, the heating process may advantageously be carried out in the apparatus shown in FIGURE 2 and the preferred method for injection of the steam into the highly viscous solutions. The solubilized starch solution in the carrier liquid, for example, caustic soda, is inserted tangentially to a zone 9 of rapidly rotating solution through pipe 7 and is simultaneously heated by a plurality of gaseous streams of steam inserted into said zone 9 through a plurality of orifices 12 from the plenum chamber 10. The plenum chamber 10 is supplied with steam from pipe 11. The heated slurry is removed preferably tangentially from the zone 9 through pipe 13.

Injection of the steam at the periphery of the rapidly rotating fluid heating zone is preferred since the steam bubbles as presented to the rapidly rotating liquid have a tendency, because of their low density with respect to the liquid phase, to migrate toward the center of the axis of rotation. This action presents a fresh liquid surface to the steam bubble, which is rapidly condensed thereby.

In the method of use shown by the device in FIGURE 2 for steam injection purposes, it is desirable that the plurality of orifices be oriented in the direction of rotation in such a way that the high velocity of the incoming steam will add to and augment the rotation of the highly viscous solubilized starch solution in zone 9. The particular angle which may be used for the orifices depends upon the diameter of the cylindrical vessel 8. In general, it is found that if the orifices are formed at an angle of about 40 to 60 degrees away from the radius in the direction of rotation satisfactory operation may be obtained.

It is apparent to those skilled in the art that the number of orifices which may be employed depend upon the size thereof, the steam consumption requirements, the pressure which is to be maintained in the rapidly rotating zone 9, and the pressure at which the steam is available. The size, on the other hand, of the orifice depends upon the severity of the mixing requirements. The more highly viscous the starch solution to condense the steam, the smaller the diameter of the orifice should be.

In general, it is found that the operation of the device for steam injection heating will be smooth and satisfactory if the diameter of the orifices is not greater than about ¼ inch. However, successful operation at larger orifice diameters is also possible, although not recommended, in order to realize substantially the full benefit of the invention. While steam hammer is avoided with employment of orifices larger than ¼ inch in diameter, the unit is not as likely to be smooth in operation, nor is it able to operate over as wide a range of flow rates and temperatures.

As in the case of the injection of starch slurries previously described herein, the number of holes is dictated by the pressure drop incurred by the steam in flowing therethrough. Satisfactory operation is found at pressure drops as low as five pounds per square inch, and at pressure drops as high as 60 pounds per square inch. Likewise, the unit is found to give satisfactory operation over wide range of pressures, temperatures and flow rates, the limits of which must be determined by experiment for the material proposed for use. As in the previously disclosed and described method of mixing, it is found that, as the flow rates are increased and higher temperature starch solutions are required therefrom that higher liquid velocities caused in the unit for practice of the process thereby increases the turbulence and accordingly increases the rate at which the steam is condensed.

It is apparent to those skilled in the art from the foregoing disclosure that instead of using simple holes or orifices 12 shown in FIGURE 2, nozzles or extensions of pipe into the rotating liquid heating zone 9 may be employed to more properly disperse the steam throughout the mixture. By this means, it is possible to prevent a cavitation phenomenon along the periphery of the inner wall of vessel 8 and thereby employ larger diameter nozzles and to obtain smoother operation than would otherwise be the case. This is not to be construed as a limitation insofar as the method of heating is concerned, but rather as a preferred method of design which will prevent undue wear and erosion in apparatus of the type described without detracting from the scope of the invention.

Although the preferred method of inserting the steam to heat the highly viscous starch solution is such as is described with regard to the apparatus shown in FIG. 2, the starch solution may, with similar facility, be heated by means of a plurality of gaseous streams discharging from the axially located pipe, i.e. as shown in FIG. 1, through holes 5 located in pipe 4 established concentrically within vessel 3. The steam in this case would enter through the holes 5 into the zone 1, which is rapidly rotating about the hollow portion of the zone defined by pipe 4, because of the motion imparted thereto by the tangential feed of the solubilized starch in the liquid as through pipe 2. The heated liquid is removed, likewise preferably, tangentially as through pipe 6.

The principal feature of importance, with regard to heating the highly viscous starch solutions, is the element of combining a rapidly rotating mass of liquid to be heated with means for inserting the steam as a plurality of gaseous streams into said zone. By employing a zone of high turbulence as presented by the cyclonic action wherein high centrifugal forces are present throughout and by inserting the steam as a plurality of gaseous streams a maximum interfacial area between the steam and the liquid is presented. Furthermore, because of the maximum interfacial area, localized hot spots are prevented apparently because of the great dispersion of steam and immediate heat transfer within the zone. Thus, the method of heating herein presented prevents overheating of certain fractions of the starch particles and the resulting tendency to degrade in an uncontrolled manner beyond the optimum degree of degradation required.

Likewise, it is apparent to those skilled in the art from the foregoing that the steam might be simultaneously inserted through a plurality of holes located at the periphery of the zone, as by means shown in FIG. 2 and through a plurality of holes located within the mass of rapidly rotating liquid such as by the means shown in FIG. 1.

In the aspect of the herein described invention directed to the combination of the heating and mixing operations, that is, where the starch-bearing cold water slurry and carrier liquid are to be simultaneously mixed and heated to a particular temperature in order to facilitate rapid solubilization of the starch and attainment of the proper temperature for degradation purposes, for example to obtain the maximum settling and flocculating power therefrom, in subsequent clarification operations, the carrier liquid is directed tangentially to the zone of rapidly rotating liquid and the starch slurry is inserted as a plurality of liquid streams into the mixing and heating zone from a hollow portion defined therein for example by a concentrically arranged pipe located axially within the zone. The steam, on the other hand, is injected preferably around the periphery of the mixing and heating zone as a plurality of gaseous streams directed preferably to augment the rotation of the liquid. This mode of operation for simultaneously heating and mixing of starch slurries with carrier liquids will be described with reference to the apparatus schematically shown in FIG. 3. The mode of operation for mixing and simultaneously heating is, as is apparent, a combination of the method of mixing as described with respect to the apparatus shown in FIG. 1 and the method of heating by live steam insertion as described with respect to the apparatus shown in FIG. 2.

As is seen in FIG. 3, the carrier liquid, which may or may not contain a gelling agent but which in the embodiment as employed for solubilizing starch for mud settling purposes in Bayer operations is a caustic solution, is injected through pipe 14 at the point of tangential entry 15 into closed cylindrical vessel 16, creating thereby the rapidly rotating heating and mixing zone 17. An aqueous slurry of starch-bearing material is fed to pipe 18 located axially with respect to the rotating zone and cylindrical vessel and is injected into the heating and mixing zone 17 through a plurality of holes 19 located in said pipe 18. It is apparent that the pipe 18 defines a hollow portion in the zone 17 and from which the liquid streams containing the starch-bearing material is inserted into the zone. At the same time, steam enters plenum chamber 21 from pipe 20 from whence it is injected into the rotating zone 17 through a plurality of orifices defined by holes 22 located in the wall of the closed cylindrical vessel and which preferably are directed in the direction of rotation of zone 17 to augment the centrifugal forces therein. The heated mixture is withdrawn preferably tangentially at point 23 through pipe 24.

It is apparent to those skilled in the art in view of the aforementioned disclosure with regard to the independent heating and mixing methods, that, although with less facility as compared to the method described in connection with FIG. 3 that slurry of aqueous starch-bearing material may be inserted from the periphery of the vessel shown in FIG. 3 through orifices 22; whereas, the steam may be injected simultaneously from the axially located pipe 18 through holes 19. However, to take advantage of the centrifugal forces and the shearing forces which are derived by inserting the condensed media (steam) in the regions of greatest centrifugal forces and the starch solution which tends to form a gel of greater density than the liquid in the regions of lesser centrifugal forces, it is preferable to insert the steam from the periphery and the starch solution from within. Still further, it is also apparent to those skilled in the art in view of the preceding disclosures, that in place of the simple holes or orifices described in FIG. 3 nozzles and/or pipes may be used to discharge the aqueous starch-bearing slurry and steam to a point within the rapidly rotating mixture. It is also apparent that many types and designs of nozzles may be used successfully for the purpose or the invention, and the practice thereof is not to be limited to one or several designs and/or arrangements of nozzles. For instance, without departing from the scope of the invention, it is also apparent that radially disposed pipes or nozzles located either in the periphery or in the centrally located pipe may be employed, with the holes or nozzles directing the discharge of the gaseous or liquid stream, as the case may be, with or against the action of the rapidly rotating liquid in the zone wherein heating and/or mixing takes place.

It will be further apparent to those skilled in the art that the method of mixing and heating shown in FIG. 3 can be employed with simultaneously mixing one or more reagent streams with the carrier liquid without departing from the scope of the invention. The practice of the invention is not, therefore, to be limited to the simultaneous heating and mixing of aqueous starch-bearing slurries with caustic liquors but rather may be employed with other liquids which cause or have the tendency to cause gel type formations and/or severe heating problems of the high viscosity starch solutions formed.

The use of the method shown in FIG. 3 for combining the mixing of starch slurries and liquids under gelation conditions with the simultaneous heating thereof has proven satisfactory and operable under a wide range of operating conditions.

The concentration of starch bearing slurries has been varied from 50 to 400 grams per liter, which has been injected at pressure drops from about 1 to 40 pounds per square inch thru holes of ¼ diameter or less. The carrier liquid has been introduced at velocities ranging from 5 to over 20 feet per second. The concentration of caustic in the carrier liquid has ranged from 0.2 to 6 normal. The residence time, based on the effluent, has ranged from 20 seconds to less than 5 seconds.

The temperatures have ranged from 200 to over 300 degrees F. Smooth operation of steam injection has been noted with orifice diameters of ¼ inch or less. The ratio of absolute pressure in the rotating mixture 17 to that of the steam in the plenum chamber 21 has varied from 0.74 to 0.96. The method is especially successful in processes utilizing the flocculating property of starch in settling red mud residues obtained from the digestion step of bauxites according to the practice of the Bayer process.

It is extremely advantageous in that the mixing and the heating occurs simultaneously and the temperatures to which the sol may be heated is widely variable almost instantaneously. Since the period for holding the starch to obtain the peak flocculating power therefrom is determined from the flow rate in the digestion vessel, instantaneous flexibility of the temperature conditions materially adds to the benefit of the herein described process. Moreover, the action of the steam when employed in this combination is such as to increase the turbulence inside the vessel. Thus, the ease with which the starch and steam are injected according to the invention readily permits the attainment of temperatures substantially above the atmospheric boiling point and over a wide range almost instantly by merely changing the steam consumption. It is therefore possible to pass the product after the combined heating and mixing process described heretofore to a holding vessel down stream therefrom, and to digest or hold the solubilized starch solution in the holding vessel until the starch has been degraded to the point where it will exhibit its maximum flocculating or settling power. Likewise, as previously indicated, the method for combining the heating and mixing of starch solutions has utility in other processes requiring cooked starches.

The method of heating and mixing as directed to the solubilizing of commercially available corn starch for employment thereof in mud settling operations of the Bayer process is effectively carried out as follows. The incoming caustic Bayer solution enters tangentially into a vessel having the general configuration shown in FIG. 3 at a velocity of about 5 to 20 feet per second. The residence time of the liquid in the vessel, based on the product effluent, may be from about 5 to 20 seconds. In general, it is preferred to operate with a ratio of three volumes of caustic Bayer liquor as the carrier liquid to one volume of cold water starch slurry, the latter of which is maintained at a concentration of about 120 grams of air-dry starch-bearing material per liter of cold water. However, as previously discussed, the concentrations which may be employed can be widely varied according to the demands of the process and general efficiency thereof. The starch is injected through a plurality of radially-drilled holes in the central disposed conduit. Steam, on the other hand, is injected from the outer plenum chamber through holes drilled in the periphery of the cylindrical vessel, the holes being directed at an angle of from about 30 to 60 degrees away from the radius in the direction of rotation of the liquid in the mixing and heating zone. The number of holes to be used depends on the most efficient range of pressure drops employed considering the flexible demands of the process.

The operating temperatures and pressures to be used will depend upon the cooking times and the characteristics of the starch-bearing material as well as the volume of the digester or holding vessel. As previously disclosed, a digestion temperature of 240 to 270 degrees Fahrenheit will digest or degrade corn starch in about 10 minutes to the point where maximum flocculating and settling power is obtained therefrom in a Bayer operation.

By way of example, the starch bearing materials processed in accordance with the above mixing and heating method have shown marked improvements, on the order of 20 percent or higher, in flocculating and settling power over those processed by some of the more conventional methods for mixing and heating. Substantial savings in the amounts of starch-bearing materials required in the operation of the Bayer process have thus been realized. Moreover, the above process is not limited to products containing corn or potato starches, but may be applied to any starch-bearing material, with due adjustments being made in operating conditions for the differing cooking characteristics of the various products.

The withdrawal of the mixture by tangentially disposed pipes 6, 13 and 24 in FIGURES 1, 2 and 3, respectively, is used to avoid a pressure drop across the unit with respect to the carrier fluid. Since the injection of steam in tangentially disposed nozzles increases the rotational velocity, the units shown in FIGURES 2 and 3 could, at least in theory, act as booster pumps.

Alternatively, if the withdrawal pipes 6, 13 and 24 in FIGURES 1, 2 and 3, respectively, were relocated to the center of the device, the mixing turbulence at the point of withdrawal would be greatly increased. That this would be so is apparent to those skilled in the art, on the basis of well-known laws of physics governing the conservation of angular momentum and the dissipation of the kinetic energy of the mixture as a result of its rotational velocity.

From the foregoing it is apparent that applicant has devised a new and novel method of mixing and/or heating cold water starch slurries and liquids under gelling conditions based on the maintenance of a rapidly rotating zone of liquid into which the steam and/or cold water starch slurry are inserted as a plurality of gaseous and/or liquid streams respectively. Although it is preferable to insert the steam from the periphery of the zone and/or the starch slurry from a point approaching the axis of rotation thereof to realize substantially the full benefit of the invention depending on whether the intent is to either heat or mix or both, the improved results which may be obtained by merely inserting the steam or starch slurry therein as a plurality of fluid streams clearly bring out the generic nature of the discovery.

The above exemplary disclosure of a typical application of the applicant's invention will readily enable those skilled in the art to apply the methods thereof to the solubilizing, dispersing, or emulsifying of other materials in liquids.

For example, the invention contemplates the dispersion or suspension of an insoluble solid in a carrier liquid. The dispersing operation may be carried out in the units shown in FIGURES 1 and 2. Thus, in FIGURE 1, the carrier liquid is fed tangentially through pipe 2 to produce and maintain a rapidly rotating liquid in zone 1. A slurry of the solid which may also contain suitable dispersing agents is fed through pipe 4 and enters into the rapidly rotating carrier liquid through the plurality of orifices 5. The resulting dispersion of the solid in the carrier liquid is removed through discharge pipe 6.

In the same manner, emulsions may be prepared whereby one immiscible liquid is fed through the plurality of orifices into the other immiscible liquid which is rapidly rotating in the mixing zone. Also in the same manner, a soluble solid may be dissolved in a liquid.

The invention has broad application in operations where thorough and extremely rapid mixing is required and a short residence time is required.

The apparatus and method of FIGURE 1 will be most applicable to the dispersal and solution of slurries and fluids which are heavier than the carrier liquid. As examples, the simultaneous mixing of sulfuric and muriatic (hydrochloric) acids with water is contemplated. Such mixtures find ready application in oil well treatments and in descaling operations. The use of such an apparatus and method in conjunction with accurate metering pumps will eliminate the use of costly batch mixing operations. Specifically, for example, a concentrated sulfuric acid (98%) may be mixed with water as the carrier liquid to produce a sulfuric acid solution of 5 to 10% strength. The water may contain a suitable corrosion inhibitor which could be introduced in a similar mixer preceding the one in which the sulfuric acid is added.

The apparatus and method of FIGURE 2 will be most applicable to the mixing of fluids and slurries which are lighter than the carrier liquid. For example, sulfur dioxide may be absorbed in dilute caustic liquors to produce solutions useful in the neutral sulfite pulping of woods. Similarly, for example, the method is applicable to the emulsification of monomers in aqueous media to allow the operation of a continuous emulsion polymerization process. Specifically, from 10 to 40 percent of a butadiene-styrene mix, or of vinyl chloride, may be mixed with an aqueous medium containing a catalyst, soap, etc. Alternatively, the apparatus of FIGURE 3 may be employed whereby the catalyst, soap, etc. are added through the central chamber 18, with the monomer being injected from the plenum chamber 21.

The apparatus and method of FIGURE 3 is applicable to a variety of mixing and heating operations. For example, the continuous production of a neutral sodium sulfite solution, useful in pulping wood, and varying from 5 to 40% in concentration, is possible. In this case, a caustic solution (50% commercial NaOH) may be injected through the central chamber 18, with the sulfur dioxide being injected through the outer plenum chamber 21.

As a further example, an asphalt emulsion useful in road paving may be continuously prepared, with the elimination of large holding and mixing tanks. A concentrated aqueous slurry or molten stream of asphalt may be injected from the central chamber 18 into an aqueous carrier liquid containing soaps and other conditioners, which could themselves be added in similar apparatus. Steam is added from the outer plenum chamber 21 to increase agitation and to melt the asphalt, if an aqueous slurry is employed. The operation may be conducted under pressure, with the final flashing step to atmospheric pressure adding further mixing ensuring the production of a stable asphalt emulsion. The production of an emulsion containing 25 to 50 percent of asphalt, with various condition agents known to those skilled in the art (caustic soda, soaps, lime, etc.) is possible.

As a still further example, the method of FIGURE 3 may be employed in various continuous fat splitting processes. Using the process of Twitchell, the carrier liquid may be a molten, acid-washed fat. A mixture of water, 25 to 50%, and catalyst (benzene stearosulfonic acid), 0.75 to 1.25%, is injected through the central chamber 18. Steam may be injected through the outer plenum chamber 21. The combination of high temperatures and excellent agitation and emulsification to be achieved with this unit will allow the use of short reaction times and efficient cleavage of the fat to glycerol and its constituent fatty acids.

The latter example illustrates that this invention is applicable to chemical reactions as well as to the simultaneous heating and mixing of materials. Examples of the application of this invention to such processes as esterification, sulfonation, etc., are also contemplated.

From the foregoing, it is readily seen by those skilled in the art that a method has been described which has application in a wide variety of mixing and/or heating operations. Although many of the applications of the method of this invention have been recited and in particular the method has been described with reference to starch solubilization, it is understood that other applications and variations within the spirit of the invention not specifically disclosed are also intended to be included within the scope of the appended claims.

This application is a continuation-in-part of my copending application S.N. 442,009, filed July 8, 1954, now abandoned.

What is claimed is:

1. A process of heating and mixing two fluids, which comprises maintaining a confined elongated mixing and heating zone which is hollow throughout at least a portion of the axial length thereof, feeding one of said fluids tangentially to said zone at one end thereof to rapidly rotate said fluid about the axis thereof, inserting the other fluid as a plurality of fluid streams into said zone, simultaneously inserting steam as a plurality of gaseous streams discharging into said zone, said plurality of gaseous streams of steam coacting with said tangentially introduced fluid to present an interfacial area between steam and fluid sufficient to provide uniform heating and prevent localized hot spots, and discharging the heated mixture from said zone at the other end thereof.

2. The process of claim 1 wherein the said steam is inserted as a plurality of separate gaseous streams discharging into said zone at the periphery thereof.

3. The process of claim 1 wherein the said steam is inserted as a plurality of separate gaseous streams discharging into said zone from said hollow portion.

4. In a process for solubilizing materials in a liquid, the improved method of mixing and heating a slurry of said materials with said liquid, comprising maintaining a confined elongated mixing and heating zone which is centrally hollow throughout at least a portion of the axial length thereof, feeding said liquid tangentially to said zone at one end thereof to rapidly rotate said liquid about the axis thereof, inserting said slurry of materials as a plurality of slurry streams into said zone, simultaneously inserting steam as a plurality of gaseous streams discharging into said zone, said plurality of gaseous streams of steam coacting with said tangentially introduced liquid to present an interfacial area between steam and liquid sufficient to provide uniform heating and prevent localized hot spots, and discharging the heated mixture from said zone at the other end thereof.

5. A process of chemically reacting materials in a fluid medium comprising maintaining a confined elongated heating and mixing zone which is centrally hollow throughout at least a portion of the axial length thereof, feeding a fluid medium containing one of said reactant materials tangentially to said zone at one end thereof to rapidly rotate said fluid about the axis thereof, inserting a second fluid medium containing the other of said reactant materials as a plurality of fluid streams into said zone, simultaneously inserting steam as a plurality of gaseous streams discharging into said zone, said plurality of gaseous streams of steam coacting with said tangentially introduced fluid to present an interfacial area between steam and fluid sufficient to provide uniform heating and prevent localized hot spots, and discharging the reacted mixture from said zone at the other end thereof.

6. In a process for solubilizing starch in an aqueous liquid, the improved method of mixing and heating an aqueous slurry of starch-bearing material with said liquid comprising maintaining a confined elongated mixing and heating zone, feeding said liquid tangentially to said zone at one end thereof to rapidly rotate said liquid about the axis thereof, inserting said aqueous slurry as a plurality of liquid streams into said zone, simultaneously inserting steam as a plurality of gaseous streams discharging into said zone, and discharging the heated mixture from said zone at the other end thereof.

7. In a process for solubilizing starch in an aqueous liquid, the improved method of heating and mixing an aqueous slurry of starch bearing material with said liquid comprising maintaining a confined elongated mixing and heating zone, feeding said liquid tangentially to said zone at one end thereof to rapidly rotate said liquid about the axis thereof, inserting said aqueous slurry as a plurality of liquid streams discharging into said zone at the periphery thereof, simultaneously inserting steam as a plurality of gaseous streams discharging into said zone, and discharging the heated mixture from said zone at the other end thereof.

8. In a process for solubilizing starch in an aqueous liquid, the improved method of heating and mixing an aqueous slurry of starch-bearing material with said liquid comprising maintaining a confined elongated mixing and heating zone which is hollow throughout at least a portion of the axial length thereof, feeding said liquid tangentially to said zone at one end thereof to rapidly rotate said liquid about said hollow portion, inserting said aqueous slurry as a plurality of liquid streams discharging into said zone from said hollow portion, simultaneously inserting steam as a plurality of gaseous streams discharging into said zone, and discharging the heated mixture from said zone at the other end thereof.

9. In a process for solubilizing starch in an aqueous liquid, the improved method of mixing and heating an aqueous slurry of starch bearing material with said liquid comprising maintaining a confined elongated mixing and heating zone, feeding said liquid tangentially to said zone at one end thereof to rapidly rotate said liquid about the axis thereof, inserting said aqueous slurry as a plurality of liquid streams into said zone, simultaneously inserting steam as a plurality of gaseous streams discharging into said zone at the periphery thereof, and discharging the heated mixture from said zone at the other end thereof.

10. In a process for solubilizing starch in an aqueous liquid, the improved method of heating and mixing an aqueous slurry of starch bearing material with said liquid comprising maintaining a confined elongated mixing and heating zone which is hollow throughout at least a portion of the axial length thereof, feeding said liquid tangentially to said zone at one end thereof to rapidly rotate said liquid about said hollow portion, inserting said aqueous slurry as a plurality of liquid streams discharging into said zone from said hollow portion, simultaneously inserting steam as a plurality of gaseous streams discharging into said zone at the periphery thereof, and discharging the heated mixture from said zone at the other end thereof.

11. In a process for solubilizing starch in an aqueous liquid, the improved method of heating and mixing an aqueous slurry of starch bearing material with said liquid comprising maintaining a confined elongated mixing and heating zone which is hollow throughout at least a portion of the axial length thereof, feeding said liquid tangentially to said zone at one end thereof to rapidly rotate said liquid about said hollow portion, inserting said aqueous slurry as a plurality of liquid streams into said zone, simultaneously inserting steam as a plurality of gaseous streams discharging into said zone from said hollow portion, and discharging the heated mixture from said zone at the other end thereof.

12. In a process for solubilizing starch in an aqueous liquid, the improved method of heating and mixing an aqueous slurry of starch bearing material with said liquid comprising maintaining a confined elongated mixing and heating zone which is hollow throughout at least a portion of the axial length thereof, feeding said liquid tangentially to said zone at one end thereof to rapidly rotate said liquid about said hollow portion, inserting said aqueous slurry as a plurality of liquid streams discharging into said zone at the periphery thereof, simultaneously inserting steam as a plurality of gaseous streams discharging into said zone from said hollow portion, and discharging the heated mixture from said zone at the other end thereof.

13. In a process employing solubilized starch as a flocculent for increasing the rate of settlement of suspended matter in chemical or metallurgical pulps, the improved method for heating and mixing an aqueous slurry of starch bearing material with caustic solution comprising maintaining a confined elongated mixing and heating zone, feeding said caustic solution tangentially to said zone at one end thereof to rapidly rotate said solution about the axis thereof, inserting said aqueous slurry as a plurality of liquid streams into said zone, simultaneously inserting steam as a plurality of gaseous streams discharging into said zone, and discharging the heated mixture from said zone at the other end thereof.

14. In a process employing solubilized starch as a flocculent for increasing the rate of settlement of suspended matter in chemical or metallurgical pulps, the improved method of heating and mixing an aqueous slurry of starch bearing material with caustic solution comprising maintaining a confined elongated mixing and heating zone, feeding said caustic solution tangentially to said zone at one end thereof to rapidly rotate said solution about the axis thereof, inserting said aqueous slurry as a plurality of liquid streams discharging into said zone at the periphery thereof, simultaneously inserting steam as a plurality of gaseous streams discharging into said zone, and discharging the heated mixture from said zone at the other end thereof.

15. In a process employing solubilized starch as a flocculent for increasing the rate of settlement of suspended matter in chemical or metallurgical pulps, the improved method of heating and mixing an aqueous slurry of starch-bearing material with caustic solution comprising maintaining a confined elongated mixing and heating zone which is hollow throughout at least a portion of the axial length thereof, feeding said solution tangentially to said zone at one end thereof to rapidly rotate said solution about said hollow portion, inserting said aqueous slurry as a plurality of liquid streams discharging into said zone from said hollow portion, simultaneously inserting steam as a plurality of gaseous streams discharging into said zone, and discharging the heated mixture from said zone at the other end thereof.

16. In a process employing solubilized starch as a flocculent for increasing the rate of settlement of suspended matter in chemical or metallurgical pulps, the improved method of heating and mixing an aqueous slurry of starch bearing material with caustic solution comprising maintaining a confined elongated mixing and heating zone, feeding said caustic solution tangentially to said zone at one end thereof to rapidly rotate said solution about the axis thereof, inserting said aqueous slurry as a plurality of liquid streams into said zone, simultaneously inserting steam as a plurality of gaseous streams discharging into said zone at the periphery thereof, and discharging the heated mixture from said zone at the other end thereof.

17. In a process employing solubilized starch as a flocculent for increasing the rate of settlement of suspended matter in chemical or metallurgical pulps, the improved methods of heating and mixing an aqueous slurry of starch bearing material with caustic solution comprising maintaining a confined elongated mixing and heating zone which is hollow throughout at least a portion of the axial length thereof, feeding said solution tangentially to said zone at one end thereof to rapidly rotate said solution about said hollow portion, inserting said aqueous slurry into said zone as a plurality of liquid streams discharging into said zone from said hollow portion, simultaneously inserting steam as a plurality of gaseous streams discharging into said zones at the periphery thereof, and discharging the heated mixture from said zone at the other end thereof.

18. In a process employing solubilized starch as a flocculent for increasing the rate of settlement of suspended matter in chemical or metallurgical pulps, the improved method of heating and mixing an aqueous slurry of starch bearing material with caustic solution comprising maintaining a confined elongated mixing and heating zone which is hollow throughout at least a portion of the axial length thereof, feeding said solution tangentially to said zone at one end thereof to rapidly rotate said solution about said hollow portion, inserting said aqueous slurry as a plurality of liquid streams into said zone, simultaneously inserting steam as a plurality of gaseous streams discharging into said zone from said hollow portion, and discharging the heated mixture from said zone at the other end thereof.

19. In a process employing solubilized starch as a flocculent for increasing the rate of settlement of suspended matter in chemical or metallurgical pulps, the improved method of heating and mixing an aqueous slurry of starch bearing material with caustic solution comprising maintaining a confined elongated mixing and heating zone which is hollow throughout at least a portion of the axial length thereof, feeding said caustic solution tangentially to said zone at one end thereof to rapidly rotate said solution about said hollow portion, inserting said aqueous slurry as a plurality of liquid streams discharging into said zone at the periphery thereof, simultaneously inserting steam as a plurality of gaseous phase streams discharging into said zone from said hollow portion, and discharging the heated mixture from said zone at the other end thereof.

20. In a process of solubilizing starch by heating and mixing two aqueous liquids, one of which contains a starch-bearing material, which comprises maintaining a confined elongated mixing and heating zone, feeding one of said liquids tangentially to said zone at one end thereof to rapidly rotate said liquid about the axis thereof, inserting the other liquid as a plurality of liquid streams into said zone, simultaneously inserting steam as a plurality of gaseous streams discharging into said zone, and discharging the heated mixture from said zone at the other end thereof.

21. A process of heating a liquid containing starch comprising maintaining a zone of said liquid as a confined elongated body which is centrally hollow throughout at least a portion of the axial length thereof, rapidly rotating said liquid about the axis thereof by feeding the liquid containing starch tangentially to said zone at one end thereof, inserting steam as a plurality of separate gaseous streams into said zone, and discharging the heated liquid containing starch from said zone at the other end thereof.

22. A process of heating a liquid containing starch comprising maintaining a zone of said liquid as a confined elongated body which is centrally hollow throughout at least a portion of the axial length thereof, rapidly rotating said liquid about an axis thereof by feeding the liquid containing starch tangentially to said zone at one end thereof, inserting steam as a plurality of separate gaseous streams discharging into said zone at the periphery thereof, and discharging the heated liquid containing starch from said zone at the other end thereof.

23. A process of heating a liquid containing starch comprising maintaining a zone of said liquid as a confined elongated body which is centrally hollow throughout at least a portion of the axial length thereof, rapidly rotating said liquid about said hollow portion by feeding the liquid containing starch tangentially to said zone at one end thereof, inserting steam as a plurality of separate gaseous streams discharging into said zone from said hollow portion, and discharging the heated liquid from said zone at the other end thereof.

References Cited in the file of this patent

UNITED STATES PATENTS

| | | |
|---|---|---|
| 1,047,831 | Neuberger | Dec. 17, 1912 |
| 1,157,739 | Tyler | Oct. 26, 1915 |
| 1,381,095 | Starr | June 7, 1921 |
| 1,496,345 | Linchlenthalaler | June 3, 1924 |
| 2,582,198 | Etheridge | Jan. 8, 1952 |
| 2,645,463 | Stearns | July 14, 1953 |
| 2,730,468 | Martin | Jan. 10, 1956 |
| 2,820,620 | Anderson | Jan. 21, 1958 |
| 2,822,157 | Porter | Feb. 4, 1958 |
| 2,935,840 | Schoppe | May 10, 1960 |

FOREIGN PATENTS

| | | |
|---|---|---|
| 1,781 of 1909 | Great Britain | Jan. 25, 1909 |
| 1,000,352 | Germany | Jan. 10, 1957 |